United States Patent Office 3,297,781
Patented Jan. 10, 1967

3,297,781
POLYEPOXIDES HAVING AT LEAST TWO 2,3-
EPOXY-2-METHYL PROPOXY GROUPS AT-
TACHED TO DIFFERENT CARBON ATOMS
Charles W. McGary, Jr., and Charles T. Patrick, Jr., South
Charleston, W. Va., assignors to Union Carbide Cor-
poration, a corporation of New York
No Drawing. Filed June 19, 1962, Ser. No. 203,458
17 Claims. (Cl. 260—830)

This invention relates to curable epoxide compositions and resins prepared therefrom. In one aspect, this invention relates to curable, polymerizable compositions comprising methylglycidyl ethers, and the partially cured and cured compositions resulting therefrom. In a further aspect, this invention is directed to the preparation of curable, partially cured, and cured compositions comprising methylglycidyl ethers which can be modified by an active organic hardener to give a wide variety of useful properties and characteristics to the compositions. In another aspect, this invention relates to effectively reducing the viscosity of polyglycidyl polyether of a polyhydric phenol to fit specific applications by incorporating therein a methylglycidyl ether as hereinafter defined.

The curable compositions of this invention can be readily handled in resin-forming operations such as coating, laminating, bonding, molding, casting, potting, and the like. These compositions are capable of accepting solid materials, such as fillers and pigments, for providing various effects in physical properties and coloration. With or without such added solid materials, the curable compositions can be made to fill small intricacies of molds without the necessity of applying high pressures or heating to high temperatures, although such measures can be employed, if desired. The curable compositions also can be easily spread, brushed, or sprayed by many techniques available in the paint, lacquer, and varnish industries for making coatings and finishes. Negligible shrinkage, if any, occurs in curing to the resin. The compositions are capable of being accurately shaped by molds having intricate molding surfaces and fully cured to resins carrying exact details of such molding surfaces. They can be also advantageously employed in the potting of such fragile articles as electronic components.

The curable, polymerizable compositions of the invention also can be partially reacted at elevated temperatures to form viscous thermosetting liquids or thermosetting solids. The resulting fusible thermosetting intermediate reaction products can be dissolved in an inert normally-liquid organic medium and applied as heat curable coatings. To aid solution, the thermosetting solid products can be powdered or granulated, if desired. The thermosetting solids also can be used as molding powder compositions which can be converted to fully cured solid products by the application of heat and/or pressure. Numerous other uses, applications, and unexpected advantages and results will become apparent upon a consideration of the various embodiments of the invention which are discussed hereinafter.

Accordingly, one or more of the following objects will be achieved by the practice of this invention. It is an object of this invention to prepare novel, curable, partially cured, and cured compositions comprising methylglycidyl ethers. A further object of this invention is directed to the preparation of novel, curable, partially cured, and cured compositions comprising methylglycidyl ethers which are modified by an active organic hardener such as polycarboxylic acids, anhydrides, polyols, and the like, to give a wide variety of useful properties and characteristics to the compositions. Another object is directed to the preparation of novel, curable and partially cured compositions comprising methylglycidyl ethers which are modified with a polyfunctional amine and react smoothly to form bubble-free, noncharred, thermoset resins. A still further object of the present invention is directed to effectively reducing the viscosity of a polyglycidyl polyether of a polyhydric phenol to fit specific applications. Another object is directed to a process for the preparation of the aforesaid curable, partially cured, and cured compositions. These and other objects will readily become apparent to those skilled in the art in the light of the teachings herein set forth.

In a broad aspect the present invention is directed to curable, polymerizable, compositions comprising methylglycidyl ethers, and the partially cured and cured compositions prepared therefrom. The methylglycidyl ethers employed in the present invention are monomeric, polyepoxides characterized by the presence in the molecule

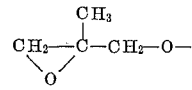

of at least two groups which are attached to different carbon atoms. Hence, by the term "methylglycidyl ether(s)," as employed throughout the specification and appended claims, is meant a polyepoxide having at least two of the aforementioned groups, i.e., at least two 2,3-epoxy-2-methylpropoxy groups which are attached to different carbon atoms in the molecule.

The methylglycidyl ethers which can be employed in the compositions of the present invention also can be conveniently represented by the formula:

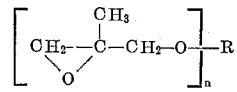

wherein $n$ is a whole positive integer greater than 1 and R represents a polyvalent organic group with the proviso that the 2,3-epoxy-2-methylpropoxy groups are attached to different carbon atoms. Preferred compounds are those represented by the aforesaid formula wherein $n$ has a value of from 2 to 8, more preferably from 2 to 4, and R represents a hydrocarbon group or a group composed of carbon, hydrogen and etheric oxygen and containing from 2 to 45 carbon atoms, and more preferably 2 to 30 carbon atoms. Particularly preferred compounds are those wherein $n$ has a value of 2 and R represents the group

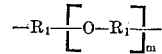

wherein $m$ has a value of from 0 to 15 and $R_1$ is a hydrocarbon group. Thus R can be alkylene, alkenylene, alkyleneoxyalkylene, arylenealkylenearylene, and the like.

In one embodiment, the methylglycidyl ethers of glycols and polyalkylene glycols wherein the glycols contain from 2 to 16 carbon atoms and more preferably from 2 to 10 carbon atoms are preferred. In these compounds at least two hydroxyl groups of the glycol have undergone etherification so that at least two methylglycidyl groups are present in each molecule. The glycol moiety of the ethers can be straight or branched chained with a methylglycidyl group at each end of the molecule.

The following compounds illustrate preferred methylglycidyl ethers: ethylene glycol bis(2,3-epoxy-2-methylpropyl) ether, diethylene glycol bis(2,3-epoxy-2-methylpropyl) ether, triethylene glycol bis(2,3-epoxy-2-methylpropyl) ether, tetraethylene glycol bis(2,3-epoxy-2-methylpropyl) ether, propylene glycol bis(2,3-epoxy-2-methylpropyl) ether, dipropylene glycol bis(2,3-epoxy-2-methylpropyl) ether, 2,2-diethyl-1,3-propanediol bis(2,3-epoxy-2-methylpropyl) ether, 2-methyl-2-propyl-1,3-propanediol bis(2,3-epoxy-2-methylpropyl) ether, 2-ethyl-2-butyl-1,3-propanediol bis(2,3-epoxy-2-methylpropyl) ether, neopentyl glycol bis(2,3-epoxy-2-methylpropyl) ether, 1,5-pentanediol bis(2,3-epoxy-2-methylpropyl) ether, 2-methyl-1,3-pentanediol bis(2,3-epoxy-2-methylpropyl) ether, 2,2-dimethyl-1,3-butanediol bis(2,3-epoxy-2-methylpropyl) ether, 2,2,4-trimethyl-1,3-pentanediol bis(2,3-epoxy-2-methylpropyl) ether, 2-ethyl-1,3-hexanediol bis(2,3-epoxy-2-methylpropyl) ether, hexylene glycol bis(2,3-epoxy-2-methylpropyl) ether, 2,2-bis(2,3-epoxy-2-methylpropoxyphenyl)propane, and the like. Additionally, preferred compounds also include the polyethylene glycol bis(2,3-epoxy-2-methylpropyl) ethers:

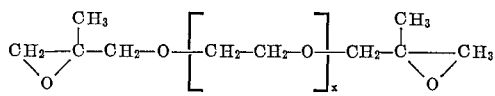

and the polypropylene glycol bis(2,3-epoxy-2-methylpropyl) ethers:

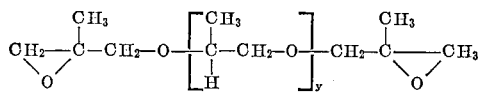

wherein $x$ and $y$ are whole positive integers of from 1 to 15 or more preferably 1 to 10. Also preferred are those compounds wherein $x$ is an integer of such value that the starting glycol has a molecular weight within the range of from about 62 to about 700. Also preferred are those compounds wherein $y$ is an integer of such value that the unetherified glycol has a molecular weight within the range of from about 76 to about 900.

The starting materials for the production of the methylglycidyl ethers are the glycol methallyl ethers and the polyalkylene glycol methallyl ethers. These compounds can be conveniently represented by the following formula:

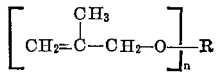

wherein R and $n$ are as previously described. These starting materials are prepared by the reaction of methallyl chloride with polyhydric alcohols or phenols containing two or more hydroxyl groups, e.g., glycols or polyalkylene glycols. Glycols suitable for use in preparing the glycol methallyl ethers are preferably those free of elements other than carbon, hydrogen and oxygen, particularly those containing from 2 to 16 carbon atoms. For example, ethylene glycol, diethylene glycol, polyethylene glycols, propylene glycol, polypropylene glycols, butanediols, pentanediols, 2-ethyl-1,3-hexanediol, 2-butene-1,4-diol, diethanolamine, triethanolamine, glycerol, polyglycerols, 1,1,1-trimethylolpropane, pentaerythritol, sorbitol, polyvinyl alcohols, cyclohexanediols, cyclohexanetriols, cyclopentanediols, trimethylolphenol, polyhydric phenols, urea-aldehyde condensates, melamine-aldehyde, dihydroxy toluene, resorcinol, 2,2-bis(4-hydroxyphenyl)propane, bis(4-hydroxyphenyl)methane, phenol-aldehyde condensates, and the like.

Illustrative starting materials herein employed are thus the di-methallyl ethers of: ethylene glycol, diethylene glycol, triethylene glycol, tetraethylene glycol, propylene glycol, dipropylene glycol, 2,2-diethyl-1,3-propanediol, 2-methyl-2-propyl-1,3-propanediol, 2-ethyl-2-butyl-1,3-propanediol, neopentyl glycol, 1,5-pentanediol, 2-methyl-1,3-pentanediol, 2,2-dimethyl-1,3-butanediol, 2,2,4-trimethyl-1,3-pentanediol, 2-ethyl-1,3-hexanediol, hexylene glycol, polyethylene glycol (molecular weight range of 190 to 210), polyethylene glycol (molecular weight range of 285 to 315), polypropylene glycol (molecular weight range of 140 to 160), polypropylene glycol (molecular weight range of 400 to 450) and the like.

Reaction conditions suitable for effecting epoxidation of the aforementioned starting materials, in general, require temperatures in the range of from —25° C. to 150° C. At the lower temperatures, the rate of epoxidation is slow, while at the higher temperatures, the rate is faster, necessitating precautions to prevent further reaction of the epoxide groups. In order to avoid undesired side reactions and to provide a suitable reaction rate, temperatures in the range of from 10° C. to 90° C. are preferable. In the practice of the invention, the unsaturated starting material is conveniently charged to a reaction vessel and the appropriate quantity of peracetic acid is added. Peracetic acid, the amount of which will vary depending on the amount of unsaturation in the unsaturated ether and on the degree of epoxidation desired, is usually added to the starting material; thus, if the unsaturated ether contains but two double bonds, two or more moles of peracetic acid are added per mole of unsaturated ether. The reaction is allowed to proceed for a time sufficient to consume approximately the theoretical quantity of peracetic acid needed to effect epoxidation. The amount of peracetic acid consumed can be determined by periodic tests for peracetic acid. Usually from about one to about ten hours is sufficient for the reaction to be completed at the preferred temperature. It is preferred, although not absolutely necessary, to separate the by-product acetic acid from the ether rapidly, since the acetic acid will react with the epoxide to form undesired products, decreasing the over-all yield. Finally, the reaction mixture is subjected to conventional recovery procedures to isolate the ether. Extraction with a suitable solvent, crystallization, continuous distillation, or distillation under reduced pressures all are applicable to the recovery of the epoxide product.

Other peroxides such as perbenzoic acid, monoperphthalic acid, acetaldehyde monoperacetate, and hydroperoxides may be used as the epoxidizing agent, but for economic reasons peracetic acid is more desirable for commercial application.

In one aspect, the invention is directed to the preparation of novel homopolymeric products of methylglycidyl ethers. These novel homopolymeric products can be prepared by contacting the methylglycidyl ether with an acidic or basic catalyst, described hereinafter, at a temperature in the range of from about 25° C., and lower, to about 250° C., and higher, and for a period of time sufficient to produce said homopolymeric products. These useful products can range from soft to hard, tough resins.

The acidic and basic catalysts which can be employed in the polymerization reaction include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted-benzenesulfonic acid, and the like; the alkali metal hydroxides, e.g., sodium hydroxide, potassium hydroxide, and the like; the tertiary amines, e.g., alpha-methylbenzyldimethylamine, dimethylethylamine, triethylamine, tripropylamine, trimethylammonium hydroxide, and the like.

Catalyst concentrations and polymerization temperatures are believed to affect the polymerization rate, the higher concentrations and temperatures promoting faster reaction rates than the lower ones. The catalyst concentration can be varied over a broad range and can be selected on the basis of the rate of polymerization desired and the polymerization temperature to be used. It has been observed that a catalyst concentration in the range of from about 0.005 to 15 weight percent, preferably from about 0.01 to 5 weight percent, based on the weight of methylglycidyl ether, is advantageous in forming useful polymeric products.

In other aspects, the invention is directed to novel curable, polymerizable compositions comprising a methylglycidyl ether and an active organic hardener, and to the partially cured (fusible thermosetting intermediate reaction products) and cured resins resulting therefrom. The active organic hardeners illustrated hereinafter are employed in a curing amount, that is, an amount which is sufficient to cause the curable system comprising the methylglycidyl ether to become a thermosetting or thermoset copolymeric resin in accordance with the teachings of the instant specification. Representative active organic hardeners include polycarboxylic acids, polycarboxy polyesters, polycarboxylic acid anhydrides, polyols, e.g., polyhydric phenols, polyhydric alcohols, and polyhydric polyesters, polyfunctional amines, polythiols, polyisocyanates, polyisothiocyanates, polyacyl halides, and the like. The novel curable compositions can contain one active organic hardener or a mixture of active organic hardeners.

The curable compositions of the invention can be prepared by mixing the methylglycidyl ether with the active organic hardener(s), preferably under agitation, so as to obtain a homogeneous mixture. The order of addition of the components does not appear to be critical. Heating is advantageous in facilitating the formation of a solution. The application of heat should not be prolonged to the extent that appreciable curing takes place.

The curable compositions of the invention can be partially cured or fully cured by maintaining the temperature in the range of from about 25° C., and lower to about 250° C., and higher, and preferably from about 25° to about 200° C. A higher curing temperature generally will provide a thermosetting or thermoset resin in less time than a lower curing temperature. One preferable method is to heat the curable compositions to a temperature within the range from about 50° C. to 150° C. to first partially cure the composition. A temperature from about 100° C. to 200° C. then can be used to complete the cure. However, any one or combination of two or more temperatures within the specified range of 25° C. to 250° C. can be employed, if desired, to effect the full cure. For casting purposes, the preferred minimum temperature of the normally-solid curable compositions is that at which said compositions form a uniform melt, whereas for coatings and the preparation of laminates, the use of solvents will allow the use of lower temperatures.

The time for effecting the partial cure or the complete cure will be governed, to an extent, on several factors such as the particular active organic hardener(s) employed, the proportions of the methylglycidyl ether and active organic hardener(s), the inclusion of an active organic hardener modifier, the inclusion of a catalyst, the concentration of the catalyst and/or modifier, the temperature for effecting the cure, and other considerations. In general, the time for effecting the complete cure can vary from several minutes to several days, e.g., from 10 minutes to 24 hours, depending upon the correlation of such factors as illustrated above.

If desired, basic or acidic catalyst such as those illustrated previously can be incorporated into the curable compositions of the invention to increase the cure rate and/or reduce the gelation period. It is generally suitable to add the catalyst to the curable composition which is maintained at a temperature in the range of from about 10° to 100° C. Agitation of the curable composition prior to, during, and after the incorporation of the catalyst is desirable to ensure a homogeneous mixture. Catalyst concentrations of the order described previously can be employed.

In one preferred embodiment, the invention is directed to novel curable, partially cured, and cured compositions comprising a methylglycidyl ether and a polycarboxylic acid in such relative amounts so as to provide from about 0.1 to about 2.0 carboxy groups, i.e., —COOH groups, of said polycarboxylic acid per epoxy group, i.e.,

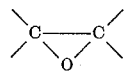

group, of the methylglycidyl ether, and preferably from about 0.3 to about 1.2 carboxy groups per epoxy group.

Representative polycarboxylic acids which can be employed include, for example, oxalic acid, malonic acid, succinic acid, glutaric acid, adipic acid, pimelic acid, suberic acid, azelaic acid, sebacic acid, alkylsuccinic acids, alkenylsuccinic acids, maleic acid, fumaric acid, itaconic acid, citraconic acid, mesaconic acid, glutaconic acid, isopropylidenemalonic acid, allylmalonic acid, muconic acid, alpha-hydromuconic acid, beta-hydromuconic acid, diglycolic acid, dilactic acid, thiodiglycolic acid, 4-amyl-2,5-heptadienedioic acid, 3-hexynedioic acid, 1,2-cyclohexanedicarboxylic acid, 1,4-cyclohexanedicarboxylic acid, phthalic acid, isophthalic acid, terephthalic acid, tetrahydrophthalic acid, tetrachlorophthalic acid, 1,8-naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl - 1,2,4-pentanetricarboxylic acid, 1,2,3-propanetricarboxylic acid, 1,2,4-benzenetricarboxylic acid, 1,3,5-benzenetricarboxylic acid, 3-hexene - 2,2,3,4 - tetracarboxylic acid, 1,2,3,4-benzenetetracarboxylic acid, 1,2,3,5-benzenetetracarboxylic acid, benzenepentacarboxylic acid, benzenehexacarboxylic acid, and the like. Copolymers of acrylic acid and an olefinically unsaturated monomer such as butadiene, styrene, ethyl acrylate, vinyl halide, and the like also can be employed. In addition, the dimerized and trimerized unsaturated fatty acids of, for example, linoleic acid, oleic acid, linolenic acid, undecylenic acid, and the like are useful. Polycarboxylic acids which have melting points below about 250° C. are desirable.

In a second preferred embodiment, the invention is directed to novel curable, partially cured, and cured compositions comprising a methylglycidyl ether and a polycarboxylic acid anhydride in such relative amounts so as to provide from about 0.1 to about 4.0 carboxy groups of the polycarboxylic acid anhydride per epoxy group of the ether, and preferably from about 0.8 to about 2.5 carboxy groups per epoxy group. It should be noted that by the expression "carboxy groups of the polycarboxylic acid anhydride" is meant the carboxy groups which would be contained by the corresponding polycarboxylic acid. For example, succinic anhydride does not possess any carboxy groups per se; however, the corresponding polycarboxylic acid is succinic acid which contains two free carboxy groups. Thus, succinic anhydride has two carboxy groups as applied in the above expression. In different language, by the expression "carboxy groups of polycarboxylic acid anhydride" is meant the carboxy groups contained in the "hydrated" polycarboxylic acid anhydride.

Illustrative polycarboxylic acid anhydrides include the aliphatic, aromatic, and cycloaliphatic acid anhydrides. The preferred anhydrides are the dicarboxylic acid anhydrides, and preferably, the hydrocarbon dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, citraconic anhydride, isocitraconic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, 4-nitrophthalic anhydride, 1,2-naphthalic anhydride, 2,3-naphthalic anhydride, 1,8-naphthalic anhydride, tetrabromophthalic anhydride, tetraiodophthalic anhydride, and the like. Polycarboxylic acid anhydrides which have melting points below about 250° C. are desirable.

In a third preferred embodiment, the invention is directed to novel curable, partially cured, and cured compositions comprising a methylglycidyl ether and a polyol in such relative amounts so as to provide from about 0.1 to about 2.0 hydroxy groups, i.e., —OH groups, of said polyol per epoxy group of the diepoxide, and preferably from about 0.2 to about 1.0 hydroxy group per epoxy group. By the term "polyol," as used herein including the appended claims, is meant an organic compound having at least two hydroxyl groups, which are alcoholic hydroxy groups, phenolic hydroxy groups, or both alcoholic and phenolic hydroxy groups. The term "polyol" preferably encompasses the polyhydric alcohols and the polyhydric phenols.

Illustrative of the polyols contemplated include, for example, the aliphatic and cycloaliphatic polyhydric alcohols, e.g., ethylene glycol, diethylene glycol, the polyethylene glycols, propylene glycol, the polypropylene glycols, the polyethylenepolypropylene glycols, trimethylene glycol, the butanediols, 2-butene-1,4-diol, the pentanediols, the pentenediols, 2-ethyl-1,3-hexanediol, the hexenediols, 2-methoxy-2,4-dimethyl - 1,5 - pentanediol, 12,13-tetracosanediol, polyglycerol, 1,1,1 - trimethylolpropane, pentaerythritol, sorbitol, the polyvinyl alcohols, the octenediols, the cyclopentanediols, the cyclohexanediols, the lower alkyl substituted - cyclohexanediols, inositol, trimethylolbenzene; and the polyhydric phenols, e.g., resorcinol, catechol, pyrogallol, hydroquinone, the dihydroxytoluenes, dihydroxyxylene, bis(4 - hydroxyphenyl) - 2,2-propane, bis(4-hydroxyphenyl)methane, 1,9-naphthalenediol, the polyhydric phenol-formaldehyde condensation products, and the like. The alkylene oxide adducts, e.g., ethylene oxide, propylene oxide, etc., of polyhydric alcohols or polyhydric phenols such as those illustrated above also are highly suitable. Polyols having melting points below about 250° C. are desirable.

A fourth preferred embodiment of the invention is directed to novel curable, partially cured, and cured compositions comprising a methylglycidyl ether and a polycarboxy polyester in such relative amounts so as to provide from about 0.1 to about 2.0 carboxy groups of said polycarboxy polyester per epoxy group of the ether, and preferably from about 0.3 to about 1.2 carboxy groups per epoxy group. By the term "polycarboxy polyester," as used herein including the appended claims is meant a polyester which contains at least two carboxy groups in the average molecule. The polycarboxy polyesters can be prepared by known condensation procedures, employing mol ratios favoring greater than equivalent amounts of polycarboxylic acid or polycarboxylic acid anhydrides with relation to the polyhydric alcohol. More specifically, the amount of polycarboxylic acid or polycarboxylic acid anhydride which is employed in the esterfication reaction should contain more carboxy groups, collectively, than are required to react with the hydroxy groups contained in the amount of polyhydric alcohol so that the resulting esterified product, i.e., polycarboxy polyester, contains at least two free carboxy groups in the average polycarboxy polyester molecule. The polycarboxylic acids, polycarboxylic acid anhydrides, and polyols which can be employed in the preparation of the polycarboxy polyesters have been illustrated previously. The polycarboxy polyesters can be obtained by condensing, in accordance with known procedures, a polyhydric alcohol and a polycarboxylic acid or a polycarboxylic acid anhydride. This condensation reaction may be conducted, for example, by heating the reactants to a temperature within the range from 100° C. to 200° C., with or without an acidic catalyst. Water formed by the condensation reaction may be removed by distillation. The course of the reaction may be followed by making acid number determinations and the reaction can be stopped when a suitable polycarboxy polyester has been obtained.

The invention also contemplates the modification of the properties and characteristics of the partially cured and fully cured compositions (resins) set forth previously in the discussion of the four preferred embodiments. Special and highly desirable effects can be imparted to the partially cured and fully cured compositions by incorporating a second active organic hardener (hereinafter termed "modifier") into the curable composition comprising the methylglycidyl ether monomer and "major" active organic hardener (i.e., polycarboxylic acid, polycarboxylic acid anhydride, polyol, polycarboxy polyester, and the like). The proportions of modifier to "major" active organic hardener are such that the number of reactive groups contained by an amount of the modifier with relation to the number of reactive groups contained by an amount of the "major" active organic hardener will be in a ratio that is less than one. It is to be understood that the term "reactive groups" pertains to groups which are reactive with the epoxy groups contained in the monomeric diepoxide. For instance, to a curable composition comprising a methylglycidyl ether and a polycarboxylic acid, there can be added an amount of a modifier, e.g., polycarboxylic acid anhydride, polycarboxy polyester, polyol, etc., such that the ratio of reactive groups contained by the modifier with respect to the carboxy groups contained by the polycarboxylic acid is less than one. On this basis the modifier can be considered to be the minor component in relation to the polycarboxylic acid. As a second illustration, if the curable composition comprises a methylglycidyl ether and a polyol, an amount of modifier, e.g., polycarboxylic acid, polycarboxy polyester, polycarboxylic acid anhydride, polyisocyanate, polythiol, etc., can be added to said curable mixture such that the ratio of the reactive groups contained by the modifier with respect to the hydroxy groups contained by the polyol is less than one. Again it will be noted that the modifier is the minor component with respect to the polyol. The modifiers which can be employed are those illustrated previously in the discussion of polycarboxylic acids, polycarboxylic acid anhydrides, polyols, polycarboxy polyesters, etc.

A fifth and particularly preferred embodiment is directed to curable, partially cured, and cured compositions comprising a methylglycidyl ether and a polyfunctional amine in such relative amounts so as to provide from about 0.2 to about 5.0 amino hydrogen atoms of said polyfunctional amine per epoxy group of the ether, and preferably from about 0.8 to about 2.0 amino hydrogen atoms per epoxy group. By the term "polyfunctional amine," as used herein including the appended claims, is meant an organic amine having at least two active amino hydrogen atoms which can be on the same nitrogen atom or on different nitrogen atoms.

Among the polyfunctional amine subclasses contemplated include the aliphatic amines, aromatic amines, aralkyl amines, cycloaliphatic amines, alkaryl amines, aliphatic polyamines including polyalkylene polyamines, amino-substituted monohydric and polyhydric aliphatic alcohols and phenols, polyamides, addition products of polyamines and low molecular weight epoxides containing oxirane oxygen linked to vicinal carbon atoms, and others.

Polyfunctional amines are typified by the aliphatic primary amines, such as, ethylamine, isopropylamine, n-butylamine, isobutylamine, 2-ethylhexylamine, monoethanolamine, monoisopropanolamine, beta alanine, amides, e.g., formamide, acetamide, propionamide, n-butyroamide, stearamides, hexahydrobenzamide, and the like; aromatic primary amines, such as, aniline, para-methylbenzylamine, and the like; heterocyclic primary amines, such as, N-(aminoethyl) morpholine, N-(aminopropyl) morpholine, and the like, the aliphatic polyamides such as, ethylenediamine, propylenediamines, butylenediamines, pentylenediamines, hexylenediamines, octylenediamines, nonylenediamines, decylenediamines, dimethylurea, 1,3-diamino-2-propanol, 3,3'-iminobispropylamine, guanidine and the like; aromatic polyamines, such as meta-, ortho-, and para-phenylenediamines, 1,4-naphthalenediamine, 1,4-anthradiamine, 3,3'-biphenyldiamine, 3,4-biphenyldiamine, 3,4-toluenediamine, meta-xylylenediamine, alpha, alpha'-bi-paratoluidine, para, para'-methylenedianiline, 1-methoxy-6-methylmeta-phenylenediamine, para, para'-sulfonyl-diamine and the like; and heterocyclic polyamines, such as piperazine, 2,5-dimethylpiperazine, melamine, 2,4-diamine-5-(aminomethyl) pyrimidine, 2,4,6-triaminopyrimidine, 3,9-bis(aminoethyl) spirobi-metadioxane, the polyalkylene polyamines, in particular, the polyethylene polyamines and polypropylene polyamines, such as diethylenetriamine, triethylenetetramine, tetraethylenepentamine, dipropylenetriamine, and the like.

The use of polyamine hardeners is of particular interest in this invention due to the desirable reactivity of methylglycidyl ethers. It has been noted, for example, that diglycidyl ethers react vigorously with aliphatic amines at ambient temperatures, e.g. 25° C., whereas the methylglycidyl ethers react smoothly to form bubble-free, non-charred, thermo-set resins, as indicated in Example 4. This unique reactivity is believed to be due to the steric hindrance of the methyl substituent to the amine-epoxide reaction. However, additional substitution, e.g., alkyl higher than methyl, rendered the ether unreactive and incompatible with the amine hardener.

A sixth highly preferred embodiment is directed to curable, partially cured, and cured compositions comprising a methylglycidyl ether, a polycarboxylic acid anhydride which contains a polymerizable double bond, and an active olefinically unsaturated organic monomer. To the curable mixture, there can be added a fourth component, that is, a polyol such as those previously described. The polyol can contain olefinic unsaturation or it can be fully saturated. However, should the polyol contain olefinic unsaturation, then the polycarboxylic acid anhydride component can be fully saturated, if desired. Thus, in the four component system both the polycarboxylic acid anhydride and the polyol components can contain olefinic unsaturation, or either component can contain olefinic unsaturation. The three and four component curable systems have been found to possess several highly desirable and unexpected advantages. The preferred systems cure very readily and gelation is oftentimes manifest at room temperature. Many of the resulting cured resins exhibit high and efficient thermal stability at elevated temperatures by virtue of including the active olefinically unsaturated organic monomer in the curable compositions. The inclusion of the active olefinically unsaturated organic monomer to the curable system also results in the lowering of the melt temperature, and in the reduction of the viscosity of the system as compared to the corresponding curable system lacking same. The saturated and unsaturated polycarboxylic acid anhydrides and polyols have been illustrated previously. Maleic anhydride is highly preferred as the polycarboxylic acid anhydride component. It is desirable that the relative proportions of monomeric methylglycidyl ether, polycarboxylic acid anhydride, and active olefinically unsaturated organic monomer, with or without the polyol component (preferably polyhydric alcohol compound), comprising the curable compositions are such so as to provide from about 0.2 to about 5.0 (preferably from about 0.4 to about 2.0) carboxy groups of anhydride per epoxy group of monomeric ether, and from 0.0 to about 2.0 (preferably from about 0.05 to about 1.0) hydroxy groups of polyol per epoxy group of monomeric ether. The quantity of active olefinically unsaturated organic monomer is most conveniently based on a ratio of ethylenic groups of said monomer per ethylenic group of polycarboxylic acid anhydride and/or polyol. Thus, it is desirable to employ the polycarboxylic acid anhydride, polyol, and active olefinically unsaturated organic monomer in amounts so as to provide from about 0.002 to about 5.0, preferably from about 0.2 to about 2.0, ethylenic groups of active olefinically unsaturated organic monomer per ethylenic group of polycarboxylic acid anhydride and/or polyol. It should be noted that the term "ethylenic group" refers to the >C=C< group. Illustrative active olefinically unsaturated monomers include the mono- and polyolefinic hydrocarbons, e.g., the heptenes, the nonenes, hexadiene, cyclopentene, cyclohexene, lower alkyl substituted-cyclohexene, styrene, divinylbenzene, and the like; the olefinic esters, ethers, and acids, e.g., divinyl ether, diallyl ether, di(2-butenyl) ether, methyl methacrylate, propyl acrylate, methyl acrylate, ethyl acrylate, methyl crotonate, allyl crotonate, crotonic acid, cinnamic acid, acrylic, diallyl phthalate, 2-pentenoic acid, and the like; and the halogenated vinylbenzenes, and the like. Styrene is highly preferred.

The use of catalysts in the novel curable compositions described in the sixth embodiment is optional. Acidic and basic catalysts such as those described previously can be employed, if desired, to increase the rate of reaction between the polycarboxlyic acid anhydride and the diepoxide. In certain instances, it may be desirable to catalyze the reaction or polymerization of the polycarboxylic acid anhydride and the active olefinically unsaturated organic monomer. Among such latter catalysts are, by way of illustration, benzoyl peroxide, t-butyl hydroperoxide, cumene hydroperoxide, acetyl peroxide, p-methane hydroperoxide, lauroyl peroxide, di-t-butyl peroxide, t-butyl perbenzoate, and the like.

A seventh preferred embodiment is directed to curable and partially cured compositions (fusible thermosetting intermediate reaction products that are viscous liquids or solids) comprising a methylglycidyl ether, and an active organic hardener, with or without a modifier, said compositions being dissolved in an inert normally-liquid organic medium such as xylene, methyl isobutyl ketone, butyl acetate, ethyl acetate, toluene, amyl acetate, and the like. The compositions dissolved in the above exemplary list of organic media can be used as, for example, surface coating which can be subsequently heat cured to hard, tough, scratch-resistant coatings.

The proportion of partially cured resin, i.e., fusible thermosetting intermediate reaction products, to organic media will depend on various factors such as the particular mixture being cured, the degree or extent of the partial cured, the particular organic medium employed, and other consideration. In general, a solution comprising from about 10 to about 90 weight percent of the partially cured resin, based on the total weight of partially cured resin and organic medium, is suitable; from about 40 to 70 weight percent of the partially cured resin, based on the total weight of partially cured resin and organic medium, is preferred. Moreover, the uncured compositions can be dissolved in the organic media exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to ensure a more uniform coating on the surface.

In another preferred embodiment, the invention is directed to the preparation of valuable varnishes which are obtained by the reaction of a methylglycidyl ether with aliphatic monocarboxylic acids, at elevated temperatures, e.g., from about 100° to about 200° C., for a period of time ranging from about 0.5 to 10 hours, and longer, followed by homopolymerizing the resulting reaction product (which contains residual or free epoxy and hydroxy groups) with a catalyst such as those described previously, preferably at a temperature in the range of from about 25° to 250° C., to thus produce high molecular weight polymeric products commonly known to the art as varnishes. The amounts of aliphatic monocarboxylic acid and monomeric ether employed are such so as to provide from about 0.3 to about 0.7 carboxy group of monocarboxylic acid per epoxy group of ether. The unsaturated aliphatic monocarboxylic acids are preferred. Illustrative acids include hexanoic acid, caprylic acid, lauric acid, capric acid, myristic acid, oleic acid, linoleic acid, stearic acid, licanic acid, ricinoleic acid, hexenoic acid, hexadienoic acid, octenoic acid, and the like. Acids derived from natural sources such as castor oil, dehydrated castor oil, coconut oil, cottonseed oil, oiticaca oil, perilla oil, olive oil, safflower oil, sardine oil, soybean oil, tall oil, tung oil, and the like, are advantageous to employ both from an economy standpoint and since highly useful varnishes result from the process. If desired, the reaction between monomeric methylglycidyl ether and the aliphatic monocarboxylic acid can be effected in the presence of an acidic or basic catalyst such as those described previously, and also, the reaction can be conducted in the presence of an inert normally-liquid organic medium. Suitable media include, for instance, the aromatic hydrocarbons, e.g., benzene, toluene, xylene, ethylbenzene, and the like; the saturated aliphatic and cycloaliphatic hydrocarbons, e.g., hexane, heptane, cyclopentane, cyclohexane, lower alkyl substituted-cyclohexane, and the like; the oxygenated organic compounds, e.g., ethyl acetate, butyl acetate, amyl acetate, acetone, methyl ethyl ketone, methyl isobutyl ketone, cyclohexanone, tetrahydrofuran, dioxane, diisopropyl ether, and the like. The homopolymerization of the reaction product which contains residual or free epoxy and hydroxy groups can also be effected, if desired, in the presence of an inert normally-liquid organic medium such as those illustrated supra. The progress of the homopolymerization reaction can be observed by determining the relative viscosity of samples drawn from the reaction mixture. In this manner, it is possible to produce partially polymerized compositions or essentially complete polymerized compositions.

The polymerized compositions of the last mentioned preferred embodiment generally are obtained as solid-like products. These polymerized compositions can be classified as drying compositions or non-drying compositions. The former are those which contain ethylenic unsaturation whereas the latter are saturated compositions. Both the drying and non-drying compositions are useful as modifiers for coating resins such as phenol-formaldehyde resins, melamine-formaldehyde resins, alkyd resins, and the like. These compositions are outstanding as modifiers because they have a wide range of compatibility, they impart improved caustic, water, and chemical resistance to the resin coatings they are modifying, and they impart improved flexibility and toughness. The drying compositions are capable of "drying" or curing to excellent protective coatings, with or without the application of heat. It is generally desirable to employ various metallic salts of organic compounds known to the art as "driers" to accelerate the drying process. The drying can be accomplished at temperatures in the range of from about 10° to about 250° C. and for a period of time sufficient to produce the desired property in the resin. The concentration of the drier compound can range from about 0.001 to about 5.0 weight percent, and higher, based on the weight of the drying compound (polymer). Suitable driers include soluble compounds containing heavy metals, e.g., cobalt, lead, manganese, calcium, zinc, iron, and the like. Examples of such driers include cobalt naphthenate, lead octanoate, and the like. The drying compositions can be treated in the various ways familiar to the varnish and paint industries to produce special or advantageous effects.

In a still further preferred embodiment, valuable varnish compositions can be obtained by the reaction of a methylglycidyl ether with polyol(s), preferably diol(s), at a temperature in the range of from about 25° to about 250° C., for a period of time ranging from about 0.5 to 10.0 hours, and longer, followed by partial or essentially complete esterification of the fusible, polymeric polyhydric product with an aliphatic monocarboxylic acid, preferably at elevated temperatures, to produce high molecular weight polymeric products (varnishes) which may contain residual or free hydroxy groups. The proportions of polyol and monomeric diepoxide employed are such so as to provide from about 0.5 to about 1.5 hydroxy groups of polyol per epoxy group of monomeric ether. The polyols and aliphatic monocarboxylic acids which can be employed have been illustrated previously. The use of catalysts and solvents, if desired, has also been discussed supra.

In a further aspect of the present invention, the methylglycidyl ethers are particularly useful as reactive diluents for polyglycidyl polyethers of polyhydric phenols. By the term "polyglycidyl polyether of a polyhydric phenol," as used herein, is meant a polyepoxide compound having terminal epoxy groups, one or more aromatic nucleus or nuclei including fused aromatic nuclei, and at least two aliphatic groups including terminal epoxy-containing aliphatic groups, the aliphatic groups being united to said aromatic nucleus or nuclei through carbon to oxygen to carbon linkages.

In the synthetic resins art, it is known that specific epoxides and resins therefrom can be prepared having special properties which fit special applications. In most cases these specific epoxides, even with additional modifications, are limited in one way or another in their applicability to only a narrow range of uses. Viscosity, for example, to a large degree limits the fields of uses of these epoxides or formulations containing these epoxides. In the manufacture of coatings, as an example, it is desirable to use coating formulations which have ranges of viscosities which are neither so low that the formulation flows off of the surface being coated nor so high that it is arduous or impossible to conveniently apply it. Also, if the coating is to be applied by spraying, a low viscosity formulation is preferable and when the coating is to be applied by brushing or wet lay-up procedures, a higher viscosity formulation is more useful. Similarly, the viscosities of these epoxides or formulations containing them are largely determinative of the fields of use to which they may be put, for example, in the casting, molding or bonding art and the like.

By employing a methylglycidyl ether with the polyglycidyl polyether, liquid compositions can be prepared having viscosities as low as 50 centipoises at room temperature, i.e., approximately 25° C. The polyglycidyl polyether curable mixtures can contain from about 2 to about 98 weight percent of a methylglycidyl ether, based on the total weight of the epoxide components. The viscosities of the liquid epoxide compositions can be controlled, as desired, without the aid of external modifications such as raising the temperature or using non-reactive solvents or reactive diluents and the like, although such modifications may be employed, if desired. These epoxide compositions can be made with the capability of accepting wide varieties of solid materials such as fillers, pigments, and the like. Thus, the liquid epoxide compositions are particularly noteworthy in being capable of accepting large amounts of solid material without at the same time entraining large amounts of air or causing damage to the solid material particles. The epoxide compositions can be cured, i.e., polymerized, by the aforementioned catalysts, or reacted with active organic hardeners, for example, polycarboxylic acids and halides, polyfunctional amines, polyhydric phenols and alcohols, polythiols, polycarboxylic anhydrides, and the like to provide a wide variety of useful articles. These epoxide compositions have improved pot-lives which can be controlled, as desired, to fit specific needs. Such epoxide compositions can be made so as to cure rapidly (in the presence of catalysts and/or active organic hardeners), or they are capable of storage without incurring appreciable gelation for extended periods prior to use whichever the manufacturing techniques being employed may demand. The lowest temperatures at which the epoxide compositions can be easily cured can be adjusted, as desired, and compositions having minimum curing temperatures as low as 10° C., and lower, can be made in accordance with the instant invention. The compositions can be cured to resins which are uniform and do not contain foam, entrained solvent or bubbles. Exothermic heat evolved during the curing of the compositions is within easily controllable limits, and expensive equipment or extra procedures for removing excess heat is not required, although such techniques can be employed, if desired. During the curing of the compositions very little shrinkage, if any, occurs and resinous articles having intricately molded surfaces can be manufactured therefrom.

The methylglycidyl ethers also can be copolymerized with other monoepoxides and/or polyepoxides. Products ranging from viscous liquids to hard, tough, thermoset resins can be obtained by varying the proportions of the coreactants. Copolymerization with polyepoxides results in the formation of cross-linked resins, the degree of crosslinking depending on such factors as the proportion of and the functionality of the polyepoxide.

Monoepoxides useful for copolymerization with the methylglycidyl ethers include ethylene oxide, propylene oxide, butylene oxide, styrene oxide, vinylcyclohexene oxide, butyl glycidyl ether, dicyclopentadiene oxide, chloroprene oxide, ethyl 3,4-epoxycyclohexanecarboxylate, vinyl 9,10-epoxystearate, glycidyl methacrylate, isobutylene oxide, butadiene monoxide, cyclohexene oxide, and the like.

Polyepoxides useful as coreactants include butadiene dioxide, diglycidyl ether, vinylcyclohexene dioxide, dicyclopentadiene dioxide, bis(2,3-epoxycyclopentyl)ether, divinylbenzene dioxide, 3,4-epoxycyclohexyl 3,4-epoxycyclohexanecarboxylates, glycol bis(3,4-epoxycyclohexanecarboxylates), bis(3,4-epoxycyclohexyl)carboxylates, diglycidyl phthalate, soybean oil epoxide, epoxidized polybutadienes and copolymers of butadiene, and the like.

The thermoset cured resins of this invention vary from soft and flexible to hard and rigid products, depending upon the proportion, the functionality, and the chain length of the active organic hardener employed. These resins are insoluble in many of the common organic solvents. The hard, infusible, rigid thermoset resins can be machined to desired shapes and configurations, and they can be polished to provide appealing finishes. The novel compositions, as indicated throughout the specification, are highly useful and valuable in fields such as the coatings, laminating, molding and encapsulation.

Many of the partially cured compositions, i.e., the so-called "B-stage" resins of this invention show outstanding utility as molding powders, "fluid-bed" and solution coatings, for "pre-preg" laminates, and the like. The unusual reactivity of the polyepoxides of this invention allows the preparation of solid, grindable, partially reacted products which can be stored for long periods of time at moderate temperatures, e.g., below 50° C. without appreciable change in degree of cure. These grindable powders therefore remain soluble in a variety of solvents and can be used in coatings and the preparation of laminates. They also can be treated with heat, with or without pressure, to be converted to a mobile liquid which on further heating is converted in an infusible, thermoset product. The aromatic polyamines are the preferred hardeners for preparing "B-stage" resins having long shelf lives.

The methylglycidyl ethers of polyhydric phenols showed particular utility as "B-stage" resin formers. For example, 2,2 - bis(2,3-epoxy-2-methylpropoxyphenyl)propane and p,p'-methylenedianiline formed a "B-stage" resin which was still fusible after storing at room temperature for 118 days.

The following examples are illustrative. Unless otherwise indicated, all parts are by weight. The Barcol hardness values were determined by the use of Barcol Impressor GYZJ–934–1 at a temperature of approximately 25° C. Also, unless otherwise indicated, the examination or description of the resins was made at 25° C. Resin preparations generally involved the mixing of the desired components in test tubes and subsequently curing at elevated temperatures. The resulting resins were broken from the glass tubes and described with regard to toughness (cutting with a knife), color, and hardness.

For additional physical property data, test bars were cast in aluminum foil molds measuring about 5½ x ¾ x ¾ inches. The resulting resins were machined to about 4½ x ½ x ¼ inches prior to testing by the following ASTM methods.

Heat distortion point, ° C. _____ D–648–45T
Izod impact, ft. lbs./in. notch _____ D–256–47T Stiffness-temperature data, given for the more flexible resins, was determined on resin samples measuring about 3 x ¼ inches and about 20–40 mils (thousandths of an inch) in thickness. An Instron testing instrument was used to measure resin stiffness, allowing the resin sample to be conditioned for five minutes at the testing temperature prior to extending the sample one percent of its length.

EXAMPLE 1

*Preparation of ethylene glycol bis(2,3-epoxy-2-methyl propyl) ether*

To a stirred flask containing 347 grams (2.04 moles) of ethylene glycol dimethylallyl ether at 45° C. to 50° C. was added 1330 grams of a 28 percent solution of peracetic acid in ethyl acetate (4.9 moles) over a period of three hours. The reaction mixture was stirred at 45° C. to 50° C. for an additional three hours after the peracetic acid addition. At the end of this period, the reaction was about 97 percent complete. Acetic acid and ethyl acetate were removed by feeding the reaction mixture to a still which contained ethylbenzene and which was refluxing under 25 millimeters pressure. After distilling off the acetic acid and ethyl acetate, the ethylbenzene was distilled. The remaining products were then distilled at a pressure of 3 millimeters, and ethylene glycol bis(2,3-epoxy-2-methylpropyl) ether boiled at 109° C. The desired product had a purity of 98 percent by pyridine-hydrochloride titration and was obtained in 88.5 percent yield.

EXAMPLE 2

*Preparation of diethylene glycol bis(2,3-epoxy-2-methylpropyl) ether*

In a manner similar to the previous experiment, 1488 grams of a 27.1 percent solution of peracetic acid in ethyl acetate (5.3 moles) was fed over a period of two hours to diethylene glycol dimethallyl ether with stirring at 45° C. to 50° C. After stirring for an additional two hours at 45° C. to 50° C., the reaction was about 97 percent complete. The reaction mixture was then fed to a still containing refluxing ethylbenzene, and the acetic acid, ethyl acetate, and finally ethylbenzene were distilled from the product under reduced pressure. Distillation at 0.5 millimeter pressure gave diethylene glycol bis(2,3-epoxy-2-methylpropyl) ether boiling at 110° C. to 125° C. The purity of the distilled product was 96 percent as determined by the pyridine hydrochloride method for oxirane oxygen.

In a similar manner, other methylglycidyl ethers, such as, the bis(2,3-epoxy-2-methylpropyl) ethers of neopentyl glycol, tetraethylene glycol, and the like, can be prepared.

EXAMPLE 3

*Preparation of polyethylene glycol bis(2,3-epoxy-2-methylpropyl) ether*

To a two-liter four-necked flask fitted with a stirrer, reflux condenser, thermometer, and dropping funnel there was charged 272 grams of the above dimethallyl ether of polyethylene glycol having an iodine value of 174. There was then added over a period of two hours 611 grams of a 29 percent solution of peracetic acid in ethyl acetate while maintaining a kettle temperature of 50° C. After an additional hour at 50° C., analysis of the kettle contents for peracetic acid indicated that the reaction was 95 percent complete. The volatiles were removed from the solution by codistillation with ethylbenzene and, finally, by heating for 30 minutes at 85° C. at a pressure of 4 millimeters Hg. The residue product weighed 302 grams, had an iodine value of 2.9, an oxirane oxygen content of 9.68 percent, and a color of one as measured on the Gardner scale.

200° C. compared to 29° C. for the 1,2-bis(2,3-epoxy-2-methylpropoxy)ethane system.

In a similar manner bis(2,3-epoxy-2-ethylhexyl)ether (7.7 grams) and N-hydroxyethyldiethylenetriamine (2.3 grams) were mixed and found incompatible at room temperature. The resulting mixture was heated on a steam bath (90–95° C.) for six hours during which time the mixture was stirred several times in an effort to obtain a homogeneous solution. The resulting product consisted of two layers, both being mobile liquids.

EXAMPLES 5–8

In order to illustrate the flexibility of resins from bis(2,3-epoxy-2-methylpropyl)ethers a series of resins were tested with regard to stiffness-modulus. The resins were prepared by weighing and mixing the desired components in a beaker and subsequently casting a resin plaque measuring three inches in diameter and from 20 to 40 mils in thickness. After curing, a sample measuring 3 x ¼ inches was cut with a stamping die. An Instron test instrument was used to measure resin stiffness, allowing the resin sample to be conditioned for five minutes prior to extending the sample one percent of its length. From the data obtained, the temperatures at which resin stiffness were 100,000 pounds per square inch have been tabulated in the following table. A small quantity of bisphenol A was generally included to serve as a catalyst since the aromatic amine hardeners cure more slowly than the aliphatic amines. For comparison, a resin was included based on the diglycidyl ether of bisphenol A. The results of the tests are tabulated in Table I below:

TABLE I.—FLEXIBLE RESINS FROM METHYLGLYCIDYL ETHER DERIVATIVES

| Example | Methylglycidyl Ethers | Grams | Catalyst [a] grams | Bisphenol A, grams | Cure, hours, ° C. | Temperature at which Stiffness-Modulus was 105 p.s.i., ° C. |
|---|---|---|---|---|---|---|
| 5 | Diglycidyl ether of bisphenol A | 6.95 | 1.05 | None | 1, 26; 2.5, 50; 1.5, 120; 6, 160. | 90 |
| 6 | 1,2-bis(2,3-epoxy-2-methylpropoxy) ethane | 6.1 | 1.9 | 0.4 | 6.5, 120; 6, 160 | 33 |
| 7 | Bis(2,3-epoxy-2-methylpropyl) ether of diethylene glycol. | 6.15 | 1.54 | 0.31 | 2, 100; 3.5, 120; 6, 160. | 2 |
| 8 | Bis(2,3-epoxy-2-methylpropyl) ether of tetraethylene glycol. | 6.8 | 1.2 | 0.4 | 6, 120; 6, 160 | −17 |

[a] 1,6-hexanediamine.

EXAMPLE 4

*Comparison of reactivity of glycidyl ethers and 2-alkyl-substituted glycidyl ethers*

1,2-bis(2,3-epoxypropoxy)ethane, 6.85 grams, and 1,2-bis(2,3-epoxy-2-methylpropoxy)ethane, 7.15 grams, were mixed in separate aluminum weighing dishes with 3.15 and 2.85 grams, respectively, of N-hydroxyethyldiethylenetriamine. The mixture based on 1,2-bis(2,3-epoxypropoxy)ethane reacted vigorously after 11 minutes while the mixture based on 1,2-bis(2,3-epoxy-2-methylpropoxy)ethane reacted smoothly to form a gel after 24 hours. A hard, tough resin was obtained after seven days at room temperature. Despite the small amount (10 grams) of resin mixtures used, the system based on 1,2-bis(2,3-epoxypropoxy)ethane reached a peak temperature of

EXAMPLES 9–11

In the following examples 1,2-bis(2,3-epoxy-2-methylpropoxy)ethane was mixed with various polyamines in the concentrations indicated in Table II. The resins were prepared and evaluated in a manner similar to that employed in the preceding examples. The results of the tests are tabulated in Table II below:

TABLE II.—RESINS FROM 1,2-BIS(2,3-EPOXY-2-METHYLPROPOXY) ETHANE AND POLYAMINES

| Example | Grams of the Methylglycidyl ether [e] | Hardener | Grams | Ratio [a] | Catalyst | Grams | Gel Time, hours, ° C. | Cure, hours, ° C. | Resin Description |
|---|---|---|---|---|---|---|---|---|---|
| 9 | 23.4 | MDA [b] | 11.6 | 1.0 | None | | 12, 80+1, 100+0.2, 120. | 12, 80; 1, 100; 1, 120; 6, 160. | Tough, Barcol, 42, HDT [c], 83°. |
| 10 | 1.0 | DETA [d] | 0.22 | 1.0 | None | | 3–4, 50 | 7.5, 50; 6, 120; 6, 160. | Tough, Barcol, 21. |
| 11 | 1.0 | DETA [d] | 0.22 | 1.0 | Bisphenol A | 0.06 | 2, 50 | 7, 50; 6, 120; 6, 160. | Tough, Barcol, 21. |

[a] Ratio of amino-hydrogen groups per one epoxide group.
[b] p,p'-Methylenedianiline.
[c] Heat distortion temperature, ° C.
[d] Diethylenetriamine.
[e] 1,2-bis(2,3-epoxy-2-methylpropoxy) ethane.

EXAMPLES 12–20

Resins were prepared from various methylglycidyl ethers and the hardeners indicated in Table III. Preparation and evaluation of the resins were conducted in a manner similar to that employed in the preceding examples. The results of the tests are set forth in Table III below:

TABLE III.—RESINS FROM METHYLGLYCIDYL ETHERS AND VARIOUS HARDENERS

| Example | Methylglycidyl Ether [a] | Grams | Hardener | Grams | Ratio [b] | Catalyst | Grams | Gel Time, hours, °C. | Cure, hours, °C. | Resin Description |
|---|---|---|---|---|---|---|---|---|---|---|
| 12 | A | 1.01 | TDI [c] | 0.44 | 0.5 | BF$_3$-MEA [d] | 0.051 | 0.1, 80 | 1, 80; 2.5, 120; 6, 160. | Hard, tough. |
| 13 | B | 1.2 | MDA [d] | 0.5 | 1.0 | Bisphenol A | 0.1 | 0.25–0.5, 120 | 6, 120; 6, 160 | Tough, Barcol, 20 |
| 14 | B | 1.2 | Phthalic anhydride. | 1.11 | 1.5 | KOH [e] | 0.02 | 0.17–0.4, 120 | 6, 120; 6, 160 | Tough, Barcol, 15 |
| 15 | B | 4.0 | 1,6-hexanediamine. | 1.0 | 1.0 | Bisphenol A | 0.2 | 0.45, 50; 0.2, 120. | 0.45, 50; 18, 120. | Tough, flexible. |
| 16 | B | 4.28 | Diethylenetriamine. | 0.72 | 1.0 | ____do____ | 0.2 | 0.83, 50 | 1, 50; 1, 120; 1.5, 160. | Do. |
| 17 | C | 1.2 | ____do____ | 0.22 | 1.0 |  |  | 2, 80 | 2, 80; 1, 120; 6, 160. | Tough, pale, yellow. |
| 18 | C | 1.2 | MDA [d] | 0.5 | 1.0 | Bisphenol A | 0.2 | 0.3, 120 | 7, 120; 6, 160 | Tough, Barcol, 20 |
| 19 | C | 1.2 | 1,6-hexanediamine. | 0.3 | 1.0 | ____do____ | 0.15 | 3–18, 26 | 19.5, 26; 7.5, 120; 6, 160. | Colorless, tough. |
| 20 | C | 1.2 | {Maleic anhydride.. {Ethylene glycol... | 0.49 0.1 | 1.0 0.3 |  |  |  | }18, 120; 12, 160. | Pale yellow, flexible. |

[a] A = 1,2-Bis(2,3-epoxy-2-methylpropoxy) ethane.
B = Bis(2,3-epoxy-2-methylpropyl) ether of diethylene glycol.
C = Bis(2,3-epoxy-2-methylpropyl) ether of neopentyl glycol.
[b] Ratio of reactive groups per one expoxide group.
[c] Toluene diisocyanate.
[d] p,p'-Methylenedianiline.
[e] Solution (10%) in ethylene glycol, indicated weight is for total solution.

EXAMPLES 21–23

In a manner similar to that employed in the preceeding examples, homopolymers were prepared from various methylglycidyl ethers by the use of a potassium hydroxide catalyst. The data obtained are set forth in Table IV below:

TABLE IV.—HOMOPOLYMERS OF METHYLGLYCIDYL ETHERS

| Example | Methylglycidyl Ether | Grams | Catalyst | Grams,[a,b] | Gel Time, hours, °C. | Cure, hours, °C. | Resin Description |
|---|---|---|---|---|---|---|---|
| 21 | 1,2-bis(2,3-epoxy-2-methylpropoxy) ethane. | 1.0 | KOH [a] | 0.02 | 8, 120 | 16, 120; 6, 160 | Tough, Barcol, 10. |
| 22 | Bis(2,3-epoxy-2-methylpropyl) ether of diethylene glycol. | 1.2 | KOH [b] | 0.04 | 2.5, 26; 3.5, 80; 0.25; 0.5, 120. | 2.5, 26; 3.5, 80; 6, 120; 6, 160. | Tough, flexible. |
| 23 | Bis(2,3-epoxy-2-methylpropyl) ether of neopentyl glycol. | 1.2 | KOH [b] | 0.04 | 2, 80; 7, 120 | 2, 80; 9.5, 120; 6, 160 | Pale yellow, flexible. |

[a] KOH solution (20%) in water, indicated weight is total solution.
[b] KOH solution (17.3%) in water, indicated weight is total solution.

EXAMPLE 24

*Shelf life of "B-stage" resins from glycidyl and methylglycidyl ethers of bisphenol A*

An aromatic amine, para, para'-methylenedianiline (20 grams) was mixed with 80 grams each of 2,2-bis(para - 2,3 - epoxypropoxyphenyl)propane and 2,2-bis(para-2,3-epoxy - 2 - methylpropoxyphenyl)propane. The resulting mixtures were heated to 60–80° C. for 15 to 30 minutes in order to obtain homogeneous solutions. The resulting solutions were poured into aluminum weighing dishes and allowed to cool to room temperature. After standing for three days, in the case of the 2,2-bis(para-2,3-epoxypropoxyphenyl)propane system, there was obtained a hard, brittle resin which was pulverized and stored. The 2,2-bis(para-2,3-epoxy - 2 - methylpropoxyphenyl)propane resin was pulverized after standing one day at room temperature.

After standing at room temperature a total of 14 days, the "B-stage" resin from 2,2-bis(para-2,3-epoxypropoxyphenyl)propane did not fuse at 120–150° C. In contrast, the resin based on 2,2-bis(para-2,3-epoxy-2-methylpropoxyphenyl)propane was still fusible at 120–160° C. after 118 days. A hard, tough, infusible resin having a heat distortion point of 112° C. was obtained after curing for six hours at 160° C.

Although the invention has been illustrated by the preceding example, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. A curable composition comprising a polyepoxide having at least two 2,3-epoxy-2-methylpropoxy groups attached to different carbon atoms and a curing amount of an active organic hardener.

2. The cured, thermoset resin obtained from the curable composition of claim 1.

3. The cured thermoset resin of claim 2 wherein said polyepoxide is an alkylene glycol bis(2,3-epoxy-2-methylpropyl) ether.

4. The cured thermoset resin of claim 2 wherein said polyepoxide is ethylene glycol bis(2,3-epoxy-2-methylpropyl) ether.

5. The cured thermoset resin of claim 2 wherein said polyepoxide is neopentyl glycol bis(2,3-epoxy-2-methylpropyl) ether.

6. The cured thermoset resin of claim 2 wherein said polyepoxide is a polyalkylene glycol bis(2,3-epoxy-2-methylpropyl) ether.

7. The cured thermoset resin of claim 2 wherein said polyepoxide is diethylene glycol bis(2,3-epoxy-2-methylpropyl) ether.

8. The cured thermoset resin of claim 2 wherein said polyepoxide is tetraethylene glycol bis(2,3-epoxy-2-methylpropyl) ether.

9. The cured thermoset resin of claim 2 wherein said polyepoxide is 2,2 - bis(2,3 - epoxy - 2 - methylpropoxyphenyl)propane.

10. The fusible, thermosetting intermediate reaction products obtained from the curable composition of claim 1.

11. A curable composition comprising a polyglycidyl polyether of a polyhydric phenol, an active organic hardener, and a polyepoxide having at least two 2,3-epoxy-2-methylpropoxy groups, said groups being attached to different carbon atoms.

12. The curable composition of claim 11 wherein said polyepoxide is an alkylene glycol bis(2,3-epoxy-2-methylpropyl) ether.

13. The curable composition of claim 11 wherein said polyepoxide is a polyalkylene glycol bis(2,3-epoxy-2-methylpropyl) ether.

14. The cured, thermoset resin obtained from the curable composition of claim 1 wherein said active organic hardener is a polycarboxylic acid anhydride.

15. The cured, thermoset resin obtained from the curable composition of claim 1 wherein said active organic hardener is a polyol.

16. The cured, thermoset resin obtained from the curable composition of claim 1 wherein said active organic hardener is a polyfunctional amine.

17. The cured, thermoset resin obtained from the curable composition of claim 1 wherein said active organic hardener is a polycarboxylic acid.

References Cited by the Examiner

UNITED STATES PATENTS

| | | | |
|---|---|---|---|
| 3,026,216 | 3/1962 | Sookne et al. | 260—2 |
| 3,100,756 | 8/1963 | Fry | 260—47 |

MURRAY TILLMAN, *Primary Examiner.*

DONALD E. CZAJA, *Examiner.*

J. J. KLOCKO, P. LIEBERMAN, *Assistant Examiners.*